(12) United States Patent
Bai et al.

(10) Patent No.: US 12,452,717 B2
(45) Date of Patent: Oct. 21, 2025

(54) INTER-CELL MEASUREMENT AND REPORTING FOR BEAM MANAGEMENT

(71) Applicant: QUALCOMM Incorporated, San Diego, CA (US)

(72) Inventors: Tianyang Bai, Somerville, NJ (US); Yan Zhou, San Diego, CA (US); Ruhua He, San Diego, CA (US); Tao Luo, San Diego, CA (US); Junyi Li, Fairless Hills, PA (US); Sony Akkarakaran, Poway, CA (US); Jelena Damnjanovic, Del Mar, CA (US); Mostafa Khoshnevisan, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 480 days.

(21) Appl. No.: 17/936,360

(22) Filed: Sep. 28, 2022

(65) Prior Publication Data
US 2023/0107840 A1    Apr. 6, 2023

Related U.S. Application Data

(60) Provisional application No. 63/251,256, filed on Oct. 1, 2021.

(51) Int. Cl.
*H04W 24/10* (2009.01)
*H04L 1/00* (2006.01)
*H04W 8/22* (2009.01)

(52) U.S. Cl.
CPC ........... *H04W 24/10* (2013.01); *H04L 1/0067* (2013.01); *H04W 8/22* (2013.01)

(58) Field of Classification Search
CPC ....... H04L 5/005; H04L 1/0067; H04L 5/001; H04W 24/10; H04W 8/22; H04W 24/02; H04W 24/08
See application file for complete search history.

(56) References Cited

U.S. PATENT DOCUMENTS

2020/0169340 A1    5/2020    Hwang et al.
2021/0111817 A1    4/2021    Khoshnevisan et al.
(Continued)

FOREIGN PATENT DOCUMENTS

EP    4260484 A1    10/2023
EP    4260487 A1    10/2023
(Continued)

OTHER PUBLICATIONS

Partial International Search Report—PCT/US2022/045286—ISA/EPO—Jan. 5, 2023.
(Continued)

*Primary Examiner* — Congvan Tran
(74) *Attorney, Agent, or Firm* — Paul M. McAdams; Procopio, Cory, Hargreaves & Savitch LLP

(57) ABSTRACT

Certain aspects of the present disclosure provide techniques for inter-cell measurement and reporting. A method that may be performed by a user equipment (UE) includes sending, to a base station (BS), an indication of one or more capabilities of the UE for inter-cell signal measurements, reporting of the inter-cell signal measurements, or both. The UE may perform inter-cell signal measurement and reporting based on the one or more capabilities.

16 Claims, 10 Drawing Sheets

(56) References Cited

U.S. PATENT DOCUMENTS

2021/0360436 A1* 11/2021 Jassal .................. H04W 36/085
2024/0179585 A1* 5/2024 Li .................... H04W 36/00837

FOREIGN PATENT DOCUMENTS

| WO | 2021045672 A1 | 3/2021 |
| WO | 2021186690 A1 | 9/2021 |
| WO | 2022146116 A1 | 7/2022 |
| WO | 2022169333 A1 | 8/2022 |

OTHER PUBLICATIONS

Vivo: "Further Discussion on Multi Beam Enhancement", 3GPP TSG RAN WG1 #105-e, R1-2104343, 3rd Generation Partnership Project (3GPP), Mobile Competence Centre, 650, Route Des Lucioles, F-06921, Sophia-Antipolis Cedex, France, vol. RAN WG11, No. e-Meeting, May 10-May 27, 2021, May 11, 2021, XP0520060971, 34 pages, Sections 3.1, 3.2.

International Search Report and Written Opinion—PCT/US2022/045286—ISA/EPO—Feb. 27, 2023.

\* cited by examiner

INTER-CELL MEASUREMENT AND REPORTING FOR BEAM MANAGEMENT

CROSS REFERENCE TO RELATED APPLICATION(S)

This application claims the benefit of and priority to U.S. Provisional Application Ser. No. 63/251,256, entitled "Inter-cell measurement and reporting for beam management" and filed on Oct. 1, 2021, which is expressly incorporated by reference herein in its entirety.

INTRODUCTION

Field of the Disclosure

Aspects of the present disclosure relate to wireless communications, and more particularly, to techniques for beam management.

Description of Related Art

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few.

These and other multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the Long Term Evolution (LTE) mobile standard promulgated by the 3rd Generation Partnership Project (3GPP). NR is designed to better support mobile broadband Internet access by improving spectral efficiency, lowering costs, improving services, making use of new spectrum, and better integrating with other open standards.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

Certain aspects of the subject matter described in this disclosure can be implemented in a method for wireless communication by a user equipment (UE). The method generally includes sending, to a base station (BS), an indication of one or more capabilities of the UE for inter-cell signal measurements, reporting of the inter-cell signal measurements, or both. The method generally includes performing inter-cell signal measurement and reporting based on the one or more capabilities.

Certain aspects of the subject matter described in this disclosure can be implemented in a method for wireless communication by a BS. The method generally includes receiving, from a UE, an indication of one or more capabilities of the UE for inter-cell signal measurements, reporting of the inter-cell signal measurements, or both. The method generally includes configuring the UE for inter-cell signal measurement and reporting based on the one or more capabilities.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for beam management. More specifically, aspects of the present disclosure provide apparatus, methods, processing systems, and computer readable mediums inter-cell signal measurement and reporting for beam management.

In certain systems, such as 5G new radio (NR), wireless devices in the system can perform inter-cell mobility. Inter-cell mobility may be a multiple-input multiple-output (MIMO) enhancement feature. Inter-cell mobility may also be referred to a L1/L2 inter-cell mobility, where the control and signaling for the inter-cell mobility is primarily by physical layer (Layer 1) and medium access control (MAC) layer (Layer 2) signaling; hence L1/L2 centric.

Inter-cell mobility allows the devices, for example a user equipment (UE), to measure and switch between (e.g., handover to) receiving beams from different cells. The different cells may correspond to different transmission reception points (TRPs) with different physical cell identifiers (PCIs). Some transmission configuration indicator (TCI) states in the serving cell may be configured based on non-serving cell signals. As discussed in more detail below, with respect to FIG. 4, signals from different cells/TRPs can have different propagation delays due to different locations and environments. The different propagation delays impacts the receive timing at the UE. The impact may be based on the timing differences between cells/TRPS and capabilities of the UE. The receiving timing impact also affects measurement and reporting for the UE. Accordingly, what is needed are techniques for inter-cell measurement capability signaling by the UE and configuration of the inter-cell measurement and reporting.

Aspects of the present disclosure provide inter-cell measurement and reporting capability signaling to the network. A UE can report its capability for inter-cell measurement of non-serving cells with different signal patterns than the serving cell, its capability for inter-cell measurement of time-overlapping signals, and its capability for minimum processing time between inter-cell measurement and reporting. The network may configure the UE for inter-cell measurement and reporting based on the reported capabilities of the UE. Aspects of the present disclosure provide approaches for selecting the UE receive beams for the inter-cell measurements and reporting the measurements. Other aspects of the present disclosure provide further techniques for the inter-cell mobility, measurement and reporting, and beam management.

Example Wireless Communication Network

Figure 1:
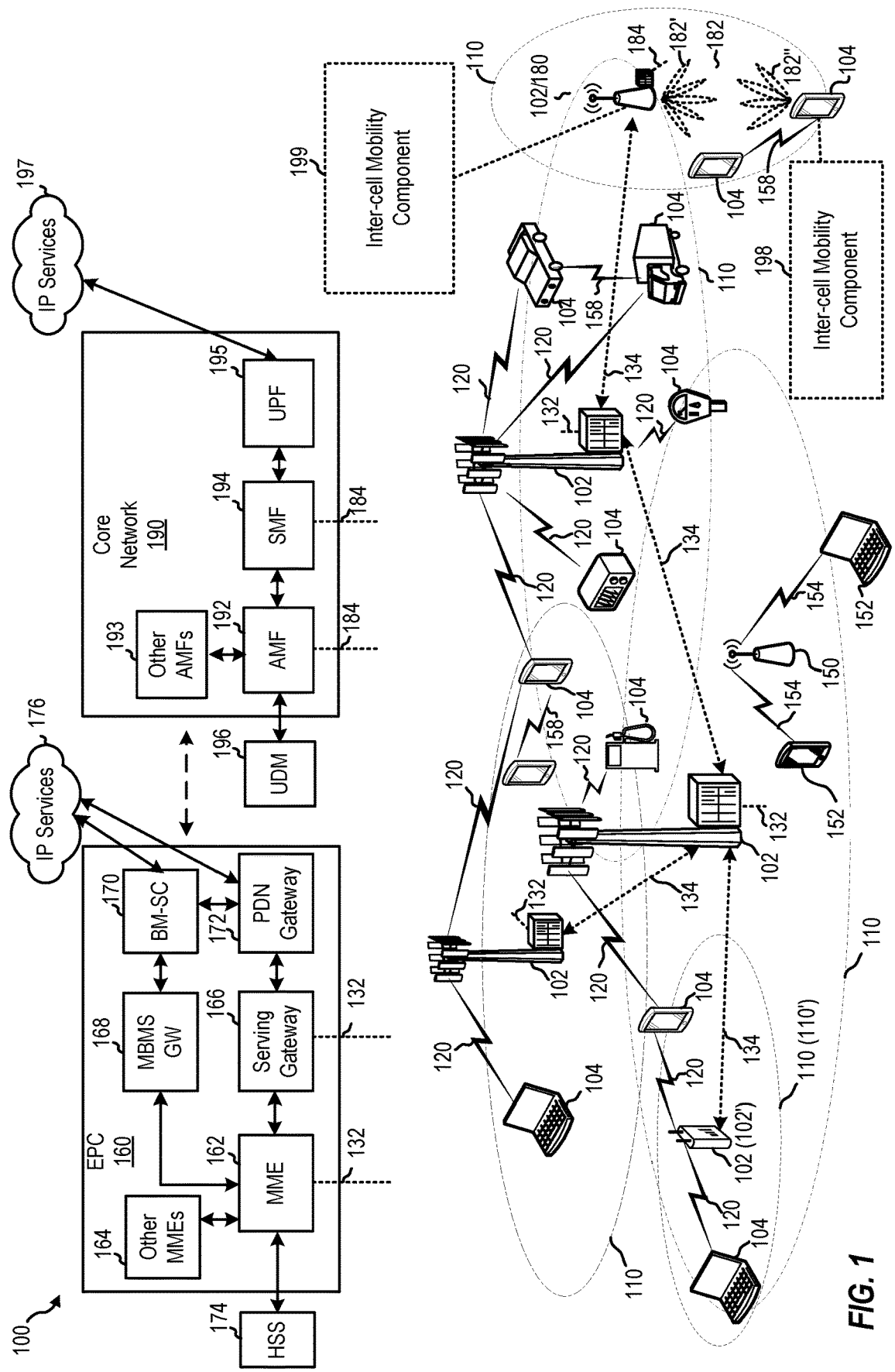
FIG. 1 is a block diagram conceptually illustrating an example wireless communication network, in accordance with certain aspects of the present disclosure.

FIG. 1 depicts an example of a wireless communications network 100, in which aspects described herein may be implemented. Wireless communication network 100 may be a new radio (NR) network (e.g., a 5G NR network).

Generally, wireless communications network 100 includes base stations (BSs) 102, user equipments (UEs) 104, an Evolved Packet Core (EPC) 160, and core network 190 (e.g., a 5G Core (5GC)), which interoperate to provide wireless communications services.

BSs 102 may provide an access point to EPC 160 and/or to core network 190 for a user equipment 104. BSs 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. BSs 102 may include and/or be referred to as a next generation Node B (gNB), a Node B, an evolved Node B (eNB), an access point (AP), a base transceiver station (BTS), a radio base station, a radio transceiver, a transceiver function, or a transmit reception point (TRP) in various contexts.

BSs 102 wirelessly communicate with UEs 104 via communications links 120. Each of BSs 102 may provide communication coverage for a respective geographic coverage area 110, which may overlap in some cases. For example, small cell 102' (e.g., a low-power BS) may have a coverage area 110' that overlaps the coverage area 110 of one or more macrocells (e.g., high-power BSs).

Communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. Communication links 120 may use multiple-input multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system (GPS), a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal (MT), a wireless terminal, a remote terminal, a handset, a user agent, a mobile client, or a client.

According to certain aspects, the BSs 102 and UEs 104 may be configured for inter-cell mobility. As shown in FIG. 1, BS 102 includes an inter-cell mobility component 199 that may perform techniques described herein for inter-cell mobility, in accordance with aspects of the present disclosure. UE 120a includes an inter-cell mobility component 198 that may perform techniques described herein for inter-cell mobility, in accordance with aspects of the present disclosure.

Figure 2:
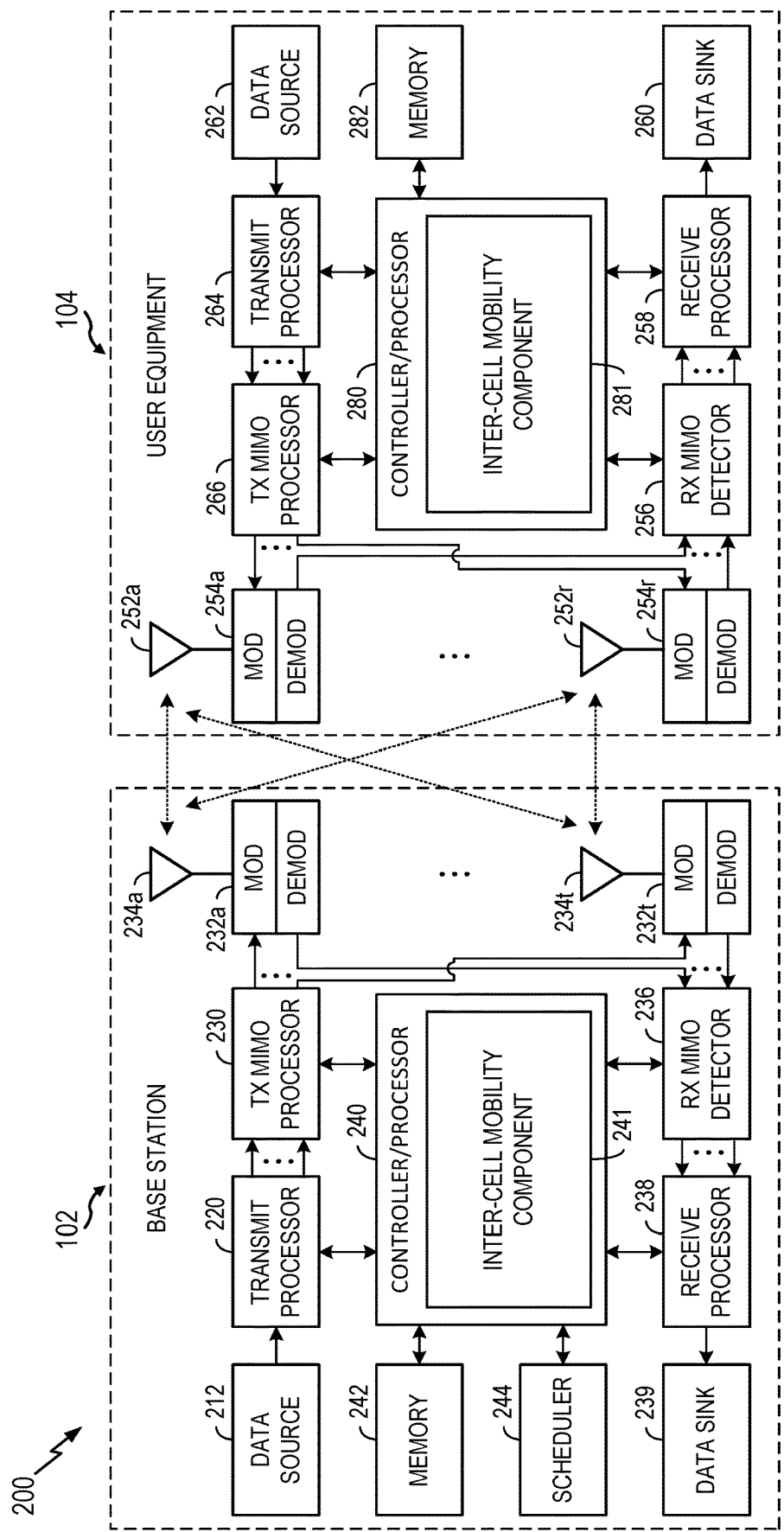
FIG. 2 is a block diagram conceptually illustrating aspects of an example base station (BS) and user equipment (UE), in accordance with certain aspects of the present disclosure.

FIG. 2 is a diagram 200 that depicts aspects of an example BS 102 and UE 104.

Generally, base station 102 includes various processors (e.g., 220, 230, 238, and 240), antennas 234a-232t, transceivers 232a-232t, which include modulators and demodulators, and other aspects, which enable wireless transmission of data (e.g., data source 212) and wireless reception of data (e.g., data sink 239). For example, base station 102 may send and receive data between itself and user equipment 104.

BS 102 includes controller/processor 240, which may be configured to implement various functions related to wireless communications. In the depicted example, controller/processor 240 includes inter-cell mobility component 241, which may be representative of inter-cell mobility component 199 of FIG. 1. Notably, while depicted as an aspect of controller/processor 240, inter-cell mobility component 241 may be implemented additionally or alternatively in various other aspects of BS 102 in other implementations.

Generally, user equipment 104 includes various processors (e.g., 258, 264, 266, and 280), antennas 252a-252r, transceivers 254a-254r, which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes inter-cell mobility component 281, which may be representative of inter-cell mobility component 198 of FIG. 1. Notably, while depicted as an aspect of controller/processor 280, inter-cell mobility component 281 may be implemented additionally or alternatively in various other aspects of user equipment 104 in other implementations.

Figure 3:
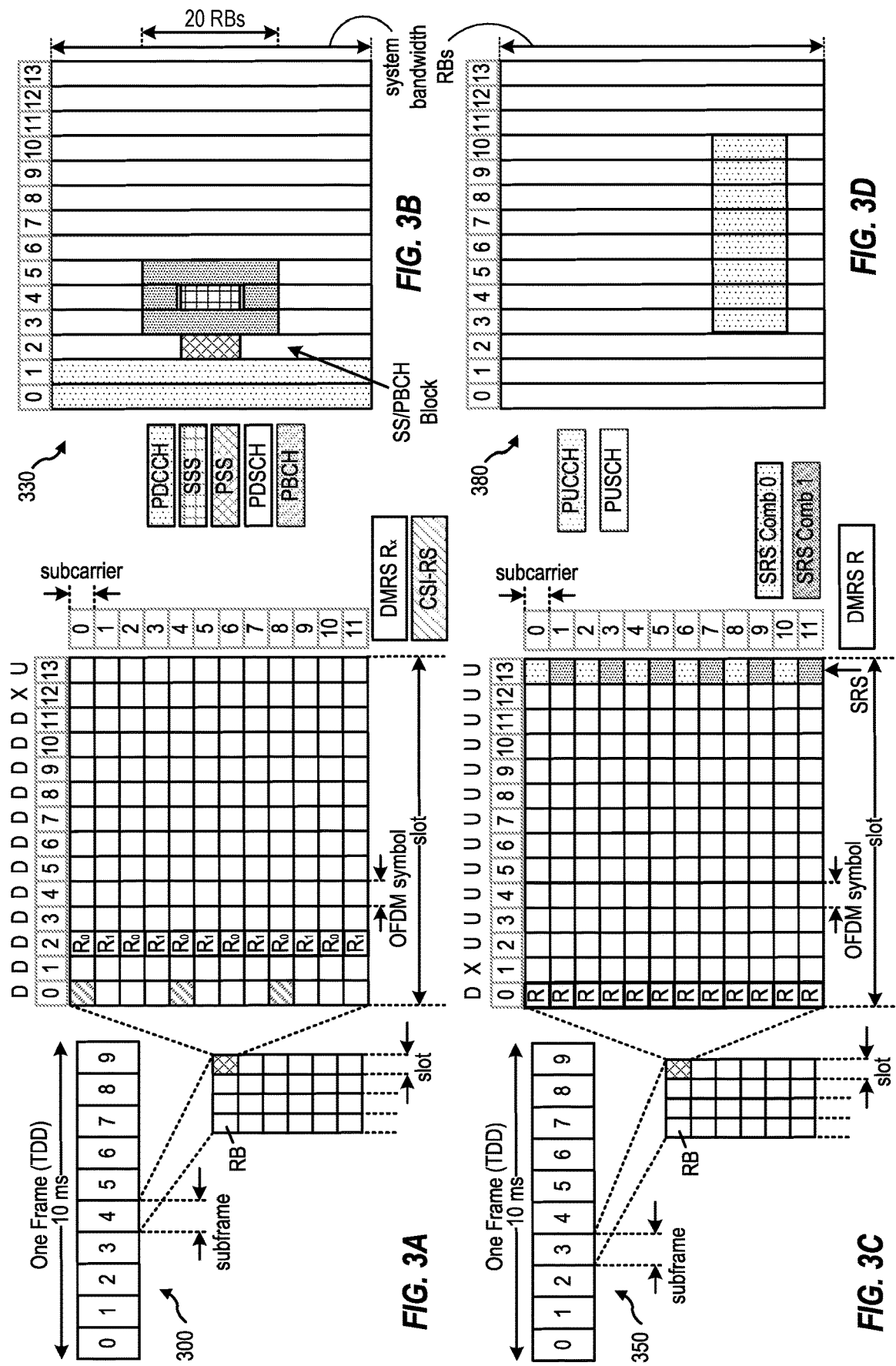
FIGS. 3A-3D depict various example aspects of data structures for a wireless communication network), in accordance with certain aspects of the present disclosure.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmWave/near mmWave radio frequency band (e.g., 3 GHz-300 GHz) may have higher path loss and a shorter range compared to lower frequency communications. Accordingly, in FIG. 1, BS 102/180 may utilize beamforming 182 with the UE 104 to improve path loss and range. To do so, BS 180 and the UE 104 may each include a plurality of antennas, such as antenna elements, antenna panels, and/or antenna arrays to facilitate the beamforming.

In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Figure 4:
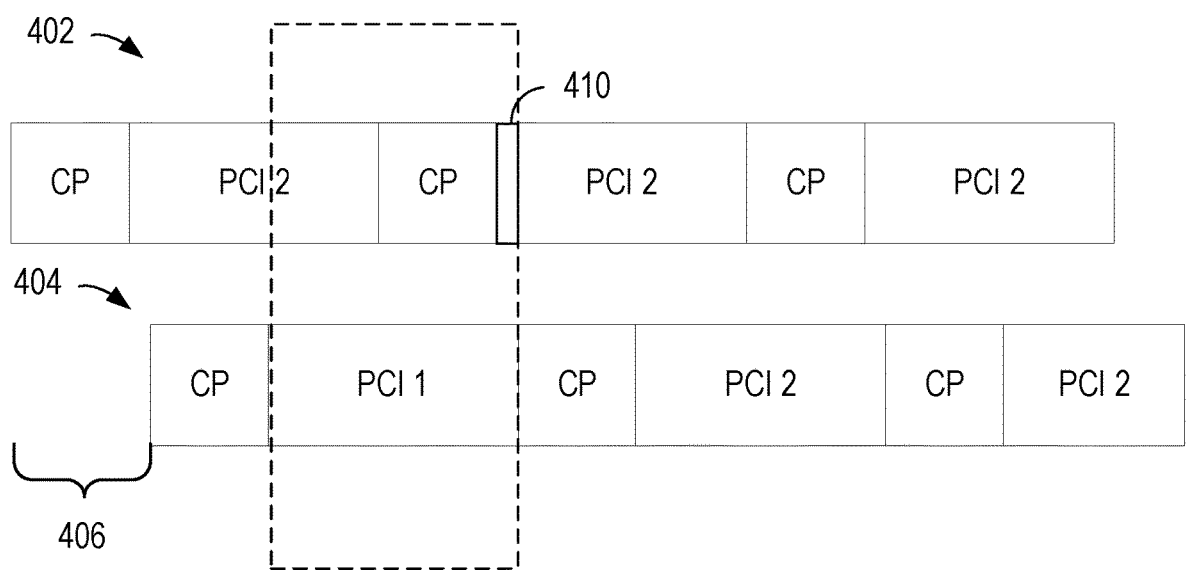
FIG. 4 is depicts an example of a timing difference between cells, in accordance with certain aspects of the present disclosure.

According to certain aspects, wireless communication network 100 supports inter-cell mobility. UEs 104 may be configured to measure signals from multiple cells with different PCIs and having different propagation delays. FIG. 4 is depicts an example of a timing difference between cells, in accordance with certain aspects of the present disclosure. As shown in FIG. 4, transmissions 404 in a first cell (PCI 1) are offset from transmissions 402 by a second cell (PCI 2) by an offset amount 406 (e.g., the different in the propagation delays of the first and second cells). If a UE switches from the first cell to the second cell, a portion 410 of the payload from the first cell may be missed. For example, when the UE uses a single Fast Fourier Transform (FFT) window, no matter where the UE sets the FFT window, a portion of the payload will be missed.

The different propagation delays impacts the receive timing at the UE. The impact may be based on the timing differences between cells/TRPS and capabilities of the UE. In an example, when the offset amount is smaller than the CP length a gap symbol may not be needed, whereas, when the offset amount is greater than the CP length, as shown in FIG. 4, a gap symbol may be used. Further, when the UE uses multiple FFT window, a gap symbol may not be needed, whereas, when the UE uses a single FFT window, as shown in FIG. 4, a gap symbol may be used.

The receiving timing impact affects measurement and reporting for the UE. For example, due to the impact of the different receive timing, the configuration of the UE for measurement and reporting of inter-cell measurements may be different than for intra-cell measurement and reporting Accordingly, what is needed are techniques and apparatus for inter-cell measurement capability signaling by the UE and configuration of the inter-cell measurement and reporting.

Example Inter-Cell Measurement and Reporting for Beam Management

Aspects of the present disclosure provide inter-cell measurement and reporting capability signaling to the network. Inter-cell measurements may be measurement of signals from different cells. The different cells may be associated with different transmission reception points (TRPs) and different physical cell identifiers (PCIs). The inter-cell measurements include measurement of signals from a serving cell and one or more non-serving cells. The measurements may be measurements of reference signals, which may be include synchronization signal block (SSB) transmissions and/or channel state information reference signals (CSI-RS). The SSBs and CSI-RSs may be associated with transmitted from a base station (BS) using different transmit (Tx) beams and/or received at a user equipment (UE) using different receive (Rx) beams. Thus, measurements of the different SSBs and/or CSI-RSs can be used for beam management and inter-cell mobility.

According to certain aspects, a wireless communication device, such as a user equipment (e.g., a UE 104 in wireless communication network 100) can report its capability for inter-cell measurement of non-serving cells to the network.

Figure 5:
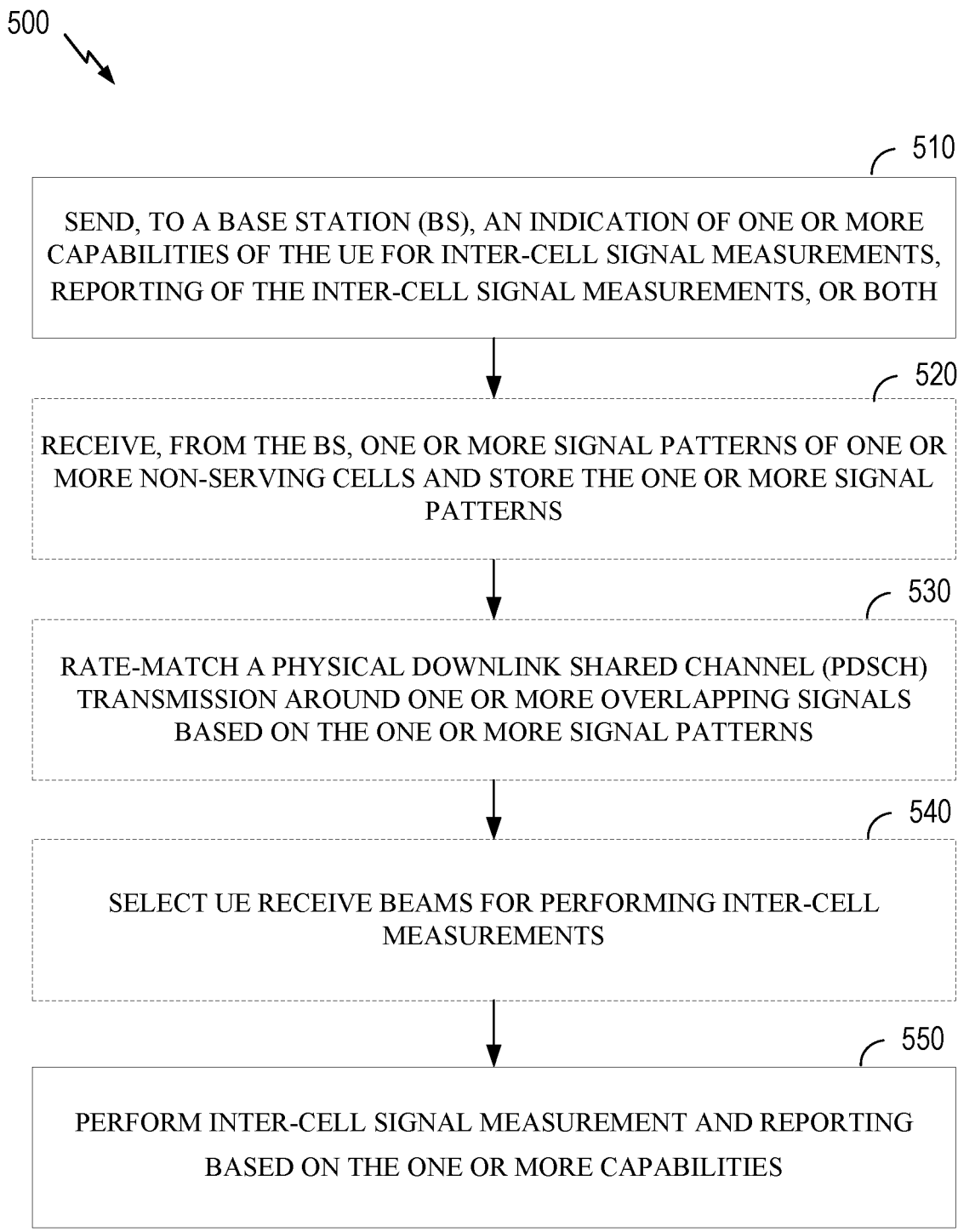
FIG. 5 is a flow diagram illustrating example operations for wireless communication by a UE, in accordance with certain aspects of the present disclosure.

FIG. 5 is a flow diagram illustrating example operations 500 for wireless communication, in accordance with certain aspects of the present disclosure. Operations 500 may be performed, for example, by a UE (such as a UE 104). Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252a-252r of FIG. 2). In certain aspects, the transmission and/or reception of signals by the UE may be implemented via a bus interface of one or more processors (e.g., controller/processor 280) obtaining and/or outputting signals.

Operations 500 may begin, at block 510, by sending, to a base station (BS), an indication of one or more capabilities of the UE for inter-cell signal measurements, reporting of the inter-cell signal measurements, or both.

Figure 6:
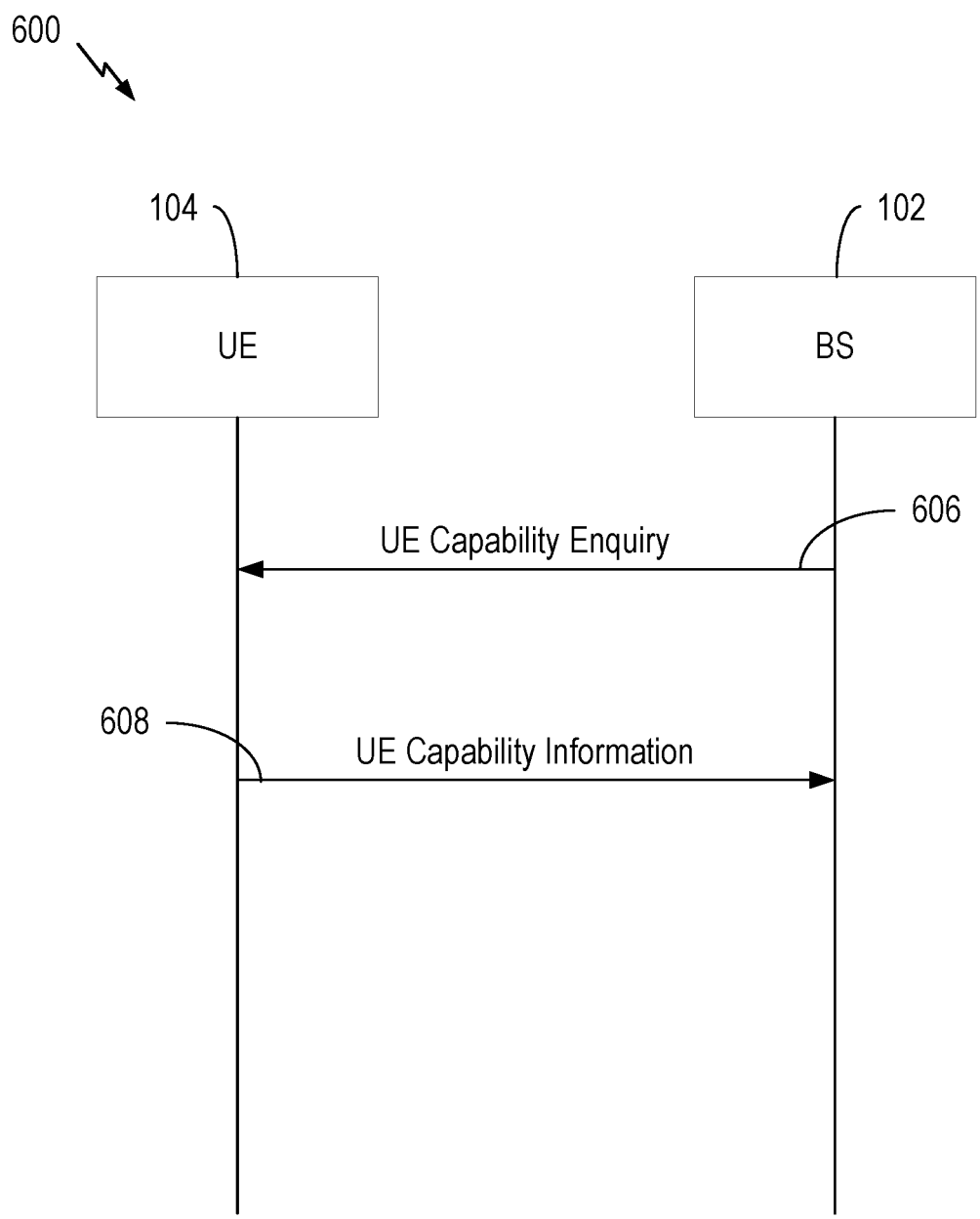
FIG. 6 is a call flow diagram illustrating an example capability exchange, in accordance with certain aspects of the present disclosure.

The one or more capabilities may be provided in a UE capability exchange. FIG. 6 is a call flow diagram illustrating an example capability exchange 600, in accordance with certain aspects of the present disclosure. As shown, a UE 104 may receive, at 606, a UE capability inquiry message from a BS 102. UE 104 replies with a UE capability information message, at 608. The UE capability information message may include the UE 104's inter-cell mobility capabilities, such as the capabilities discussed in more detail below. The capability exchange 600 may be via radio resource control (RRC) signaling. The capability exchange 600 may occur immediately after initial access.

In an example capability for inter-cell measurement of non-serving cells to the network, UE 104 reports with its capability for inter-cell measurement of non-serving cells different signal patterns than the serving cell. The signal pattern define the times and/or frequency locations of SSB or CSI-RS transmission for the corresponding cell.

The UE may typically know the signal pattern of the serving cell. To support inter-cell measurement of non-serving cells, the UE may memorize the additional signal patterns of the non-serving cells. The UE may use the signal patterns for rate matching, At block 520, in response indicating its capability for inter-cell measurement of non-serving cells different signal patterns than the serving cell, the BS may provide the UE with the signal patterns of the non-serving cells (or some of the non-serving cells). The UE can then store those signal patterns. SSBs and/or CSI-RS by the non-serving cells may overlap a physical downlink shared channel (PDSCH) transmission. The PDSCH should rate match round its scheduling cell's signals. Accordingly, at block 530, the PDSCH may be rate-matched around the SSBs and/or CSI-RSs of non-serving cells based on the signal patterns. In some examples, the PDSCH is rate-matched around all resource elements (REs) of the non-serving cell SSBs/CSI-RSs in symbols in which the SSBs/CSI-RSs overlap the PDSCH. In some examples, the PDSCH is rate-matched around only the SSB/CSI-RS REs that overlap PDSCH REs. In some examples, the PDSCH is rate-matched further around some additional REs around the overlapped REs.

In another example capability for inter-cell measurement of non-serving cells to the network, UE 104 reports its capability for inter-cell measurement of signals overlapping in time. If the UE reports that it cannot measure signals from different cells that overlap in time, then the BS configures the signals (e.g., SSBs and/or CSI-RSs) from different cells to be time division multiplexed (TDMed). In some cases, the UE does not report this capability, instead, the BS always configures the signal from different cells as TDMed.

According to certain aspects, UE 104 reports its capability for the maximum number of overlapping inter-cell signals the UE can measure. The BS then configured at most up to the reported maximum number of overlapping inter-cell signals.

In addition, the BS may configure one or more gap symbols between signals that are consecutive in time. The length of the gap may be based on the subcarrier spacing (SCS) of the consecutive signals. When the SCS of the consecutive signals is the same, the time gap may be shorter and when the SCS of the consecutive signals is different, the time gap may be longer.

In another example capability for inter-cell measurement of non-serving cells to the network, UE 104 reports its capability for minimum processing time between inter-cell measurement and reporting. The UE can measure the signals (e.g., SSBs and/or CSI-RSs) from the serving cell and one or more non-serving cells and make signal measurements, such as reference signal received power (RSRP) measurements. The UE may be configured to report the measurements to the BS. The minimum processing delay may indicate a time needed after taking the measurements, for the UE to process the measurements and generate the report, before the sending the report. The network may configure the UE for inter-cell measurement and reporting based on the reported capabilities of the UE. For example, the BS will schedule the UE to report measurements not sooner than a period of the reported minimum processing delay after the measurements.

In some cases, the minimum processing delay may be longer for an inter-cell measurement report than for an intra-cell measurement report. The minimum processing delay may depend on the number of non-serving cells the UE is configured to measure. Further, the minimum processing delay may be different for reporting the inter-cell measurements of the TDMed signals than for reporting the inter-cell measurements of time-overlapped signals. The minimum processing delay for reporting the inter-cell measurements of the time-overlapped signals may depend on the number of time-overlapped inter-cell signals the UE is configured to measure.

Aspects of the present disclosure provide approaches for selecting the UE receive beams for the inter-cell measurements and reporting the measurements. At block 540, UE 104 may select one or more receive beams to use for the inter-cell measurements of the serving cell and one or more non-serving cells. At block 550, the UE performs inter-cell signal measurement and reporting based on the one or more capabilities.

According to certain aspects, the UE measures the serving cell SSB using a refined receive beam (e.g., a narrow beam) and the UE measures the non-serving cells using a wide beam receive beam (e.g., an omni beam or pseudo-omni beam). The different receive beams may be associated with different Rx beamforming gain. The UE may report the raw measurement values (e.g., RSRPs) or the UE may compensate for the different Rx beamforming gain (e.g., by adjusting the measurement values) and report the compensated values to the BS.

According to certain aspects, the UE is configured (e.g., by the BS or hardcoded according to the 3GPP wireless standards) to perform the inter-cell measurements using one or more Rx beams with the same (or similar) Rx gain. In some examples, the BS can implicitly indicate to the UE to use Rx beam with the same or similar Rx gain for inter-cell measurements by configuring the UE to measure the serving cell reference signals (e.g., SSBs and/or CSI-RSs) and the non-serving cell RSs in the same configuration (e.g., in the same CSIReportConfig for L1 measurement).

The UE may use omni-beams or pseudo-omni beams on different UE antenna panels for the inter-cell measurements of the time-overlapped signals from different cells. The UE may use omni-beams or pseudo-omni beams on the same UE antenna panel for the inter-cell measurements of TDMed signals from different cells. The UE may report the best measured metric per signal (e.g., per-SSB and/or CSI-RS).

According to certain aspects, the UE may report up to two measurement values (e.g., two RSRPs) for serving cell, and one measurement value per non-serving cell. The UE may use one or more Rx beams of the same or similar gain for the serving cell and non-serving cells for at least one of the up to two measurement values for the serving. The may use a receive beam with a different Rx gain for the other measurement value for the serving cell. The UE may measure multiple RS from multiple cells. The UE can report which measurements were taken using beams of the same or similar Rx gain.

According to certain aspects, UE 604 can use differential reporting to report the inter-cell measurements. With differential reporting, UE 604 can reduce overhead by reporting one measurement value, and then reporting other measurement values as a differential with respect to the reported value.

In some example, the UE reports M groups of measurement values. Each group may be associated with measurements of N different signals, cells, and/or beams. The N measurements may be N simultaneously measured signals/cells/beams. For example, RS resource sets can be preconfigured and associated to a group. Each of the sets/groups may correspond to a TRP.

According to certain aspects, for inter-cell beam measurement reporting, each of the preconfigured sets may correspond to a TRP/PCI/beam group of different cells, where RSs/beams may correspond to different PCIs. The largest RSRP of each of the groups may be reported as an absolute value, and the rest of the RSRPs may be reported as the difference from the largest RSRP. In some examples, the UE also reports the RS IDs. The UE may reports the group containing the largest of the RSRPs in the first group. The measurement report may include an indication of the TRP/PCI/beam group or the preconfigured set that contains the largest RSRP value.

According to certain aspects, the largest measurement value is reported as the first value in the first group, and all other groups follow the same RS resource set ordering as the first group. For example, if the largest measurement value belongs to the second RS set, the reporting order within each group is {Beam of Set2, Beam of Set1, Beam of Set3, Beam of Set4}. Alternatively, the measurement value and RS ID corresponding to the first RS set always appears first.

The UE may be configured with a rule for beam switching latency. The beam switching latency may refer to a time period for the UE to switch its receiving beam after receiving downlink control information (DCI) indicating an updated beam (e.g., a TCI state) or after receiving hybrid automatic repeat request (HARQ) acknowledgment/negative acknowledgment (A/N) information. The old beam and new beam may be associated with different PCIs.

In one case, the old and new beams may be received by a same UE antenna panel, or the UE only maintains a single FFT window. In that case, the UE may need additional switching latency (e.g., one or more symbols to a legacy switching switching) for the UE to adjust its timing. In another case, the old and new beams are received by separate UE antenna panels, or the UE maintains multiple FFT windows. In this case, the UE may not need the additional switching latency. However, the BS may not know when the old and new beams are on the same or different UE antennas and, therefore, may not know whether the UE needs the additional switching latency. According to certain aspects, the UE may report the UE antenna panel associated with each TCI. According to certain aspects, the UE may report which UE antenna panels shared a same FFT window (e.g., each UE antenna panel may have its own FFT window or all UE antenna panels may share the same FFT window). According to certain aspects, a rule may be configured in the 3GPP standards specifying that every UE antenna panel has its own FFT window (thus, the BS can assume that the UE antenna panels have its own FFT window).

A TCI state may be a joint DL/UL TCI state, an UL TCI state, or a DL TCI state. A TCI state can be used for multiple DL and/or UL channels. For example, a DL TCI state may be used for all PDSCH and PDCCH and an UL TCI can be used for all PUSCH and PUCCH. The number of activated TCI states for DL transmission may be N and the number of TCI states for UL may be M. When M or N>1, the BS may down-select one activated TCI state for a particular transmission. A TCI state of the serving cell can be defined based on one or more non-serving cell SSB and/or CSI-RS for the purpose of inter-cell mobility and beam management.

According to certain aspects, the UE can report its capability for the number of activated TCI states the UE supports. The UE may reports its capability for a total number of activated TCI states or the UE reports its capability separately for the number of supported activated UL TCI states, DL TCI states, and/or joint DL/UL TCI states. According to certain aspects, the UE may report its capability for a number of activated TCI states for the serving cell RS and a number of activated TCI states for the one or more non-serving cells RSs.

According to certain aspects, a TCI state may be defined on the non-serving cell RS. A source RS of the TCI state is a non-serving cell RS. A root RS in a quasi-colocation chain (QCL) chain of the serving cell TCI state may be a non-serving cell RS. In the case of N,M=1, only a single TCI state may be activated for DL and/or UL channels on the serving cell. In this case, for inter-cell BM, at least one non-serving cell TCI state can be also activated for channels on the non-serving cell. The maximum number of activated non-serving cell TCI states may depend on the UE's capability.

In an illustrative example, an activated TCI (TCI 1) is associated with both non-UE dedicated and UE dedicated channels/RSs on the serving cell and another activated TCI (TCI 2) is associated with UE dedicated channels/RSs on one or more non-serving cells. According to certain aspects, a beam (e.g., a TCI) is indicated in a DCI or in a medium access control (MAC) control element (CE). A new MAC-CE or DCI format may be defined with a field used to update the activated TCI state for the serving and non-serving cell. According to certain aspects, an additional bit may be included in the beam indication signaling to indicate whether to update the TCI for the serving cell and/or one or more non-serving cells. According to certain aspects, the UE can be implicitly indicate whether to update the TCI for the serving cell and/or the one or more non-serving cells. For example, if the indicated TCI state has a QCL source from a non-serving cell, then the TCI update from the BS will be applied to all UE dedicated channels/RSs on the non-serving cell and the activated TCI for the serving cell is not affected.

In certain systems (e.g., Release 16 3GPP systems), only a single MAC-CE is sent to update a TCI state across multiple bandwidth parts (BWPs) or component carriers (CCs). The applicable BWP/CCs may be indicated to the UE in a list. For inter-cell measurement, when a common TCI ID is selected to be applied for multiple BWPs/CCs, the corresponding TCI state across those BWPs/CCs has a source RS from the same cell/PCI (e.g., an SSB with either the serving cell or non-serving cell's PCI). If the source RS is not from the same cell/PCI, then the updated TCI/beam from the MAC-CE will not be applied to all of the CCs/BWPs.

According to certain aspects, after a number of symbols (e.g., 28 symbols) from receiving the response of a BS, both BS and UE reset the beam(s) at least for a control resource set(s) (CORESETs) associated with a failed beam failure detection-reference signal (BFD-RS) set, if a new candidate beam is reported for the failed BFD-RS set in the modified beam failure recovery (BFR) MAC-CE. In some cases, the resetting of the CORESET beam is only performed when a CORESETPoolIndex is configured. The association between CORESET(s) and the failed BFD-RS set can be configured by the BS or based on a fixed rule. The same beam resetting rule may be extended to PUCCH for fast recovery of an UL beam for HARQ ACK and beam report. In addition, in presence of PDCCH repetition, the 28 symbols duration may start from the last repetition. If the CC for beam failure recovery (BFR) response and the CC with failed TRP have different SCSs, the SCS of the 28 symbols can be determined as the largest SCS of them.

In some aspects, after the beam resetting, the PUCCH power can be determined based on some predefined rule. For example, the q_u for the P0 determination is 0. The q_d for the PL RS determination is the reported new beam identification reference signal (NBI-RS) for the failed BFD RS set. For the closed loop index 1, 1=0 if the UE is not provided two PUCCH-PC-AdjustmentStates in RRC. Otherwise, 1 is the failed BFD RS set index, which can be either 0 or 1.

In some aspects, the association between CORESET(s) and the failed BFD-RS set can be determined based on the following rules. If COERSETPoolIndex is available, the CORESET(s) associated with the failed BFD-RS set should have the CORESETPoolIndex same as the failed BFD-RS set index. Otherwise, the association can be identified by introducing an RRC linkage between each CORESET and the associated BFD-RS set index.

In some aspects, for the association between PUCCH(s) and the failed BFD-RS set, the association can be identified in a unified way by introducing an RRC linkage between each PUCCH resource or PUCCH resource group introduced in R16 and the associated BFD-RS set index. For instance, for multiple DCI multiple TRP with explicitly or implicitly configured BFD RS and single DCI multiple TRP with explicitly configured BFD RS, the associated PUCCH resources can be identified by introducing an RRC linkage between each PUCCH resource or PUCCH resource group and the associated BFD-RS set index.

In some aspects, for the association between PUCCH(s) and the failed BFD-RS set, at least two PUCCH resource groups introduced in R16 can be configured, and the associated PUCCH resources should have the PUCCH resource group index same as the failed BFD-RS set index.

In some aspects, for the PUCCH beam resetting after the response, the association between PUCCH resources and failed BFD-RS set can be determined based on some predefined rules. For instance, for multiple DCI multiple TRP with explicit or implicit BFD RS and single DCI multiple TRP with explicit BFD RS, at least two PUCCH resource groups introduced in R16 can be configured, and the associated PUCCH resources should have the PUCCH resource group index same as the failed BFD-RS set index.

Figure 7:
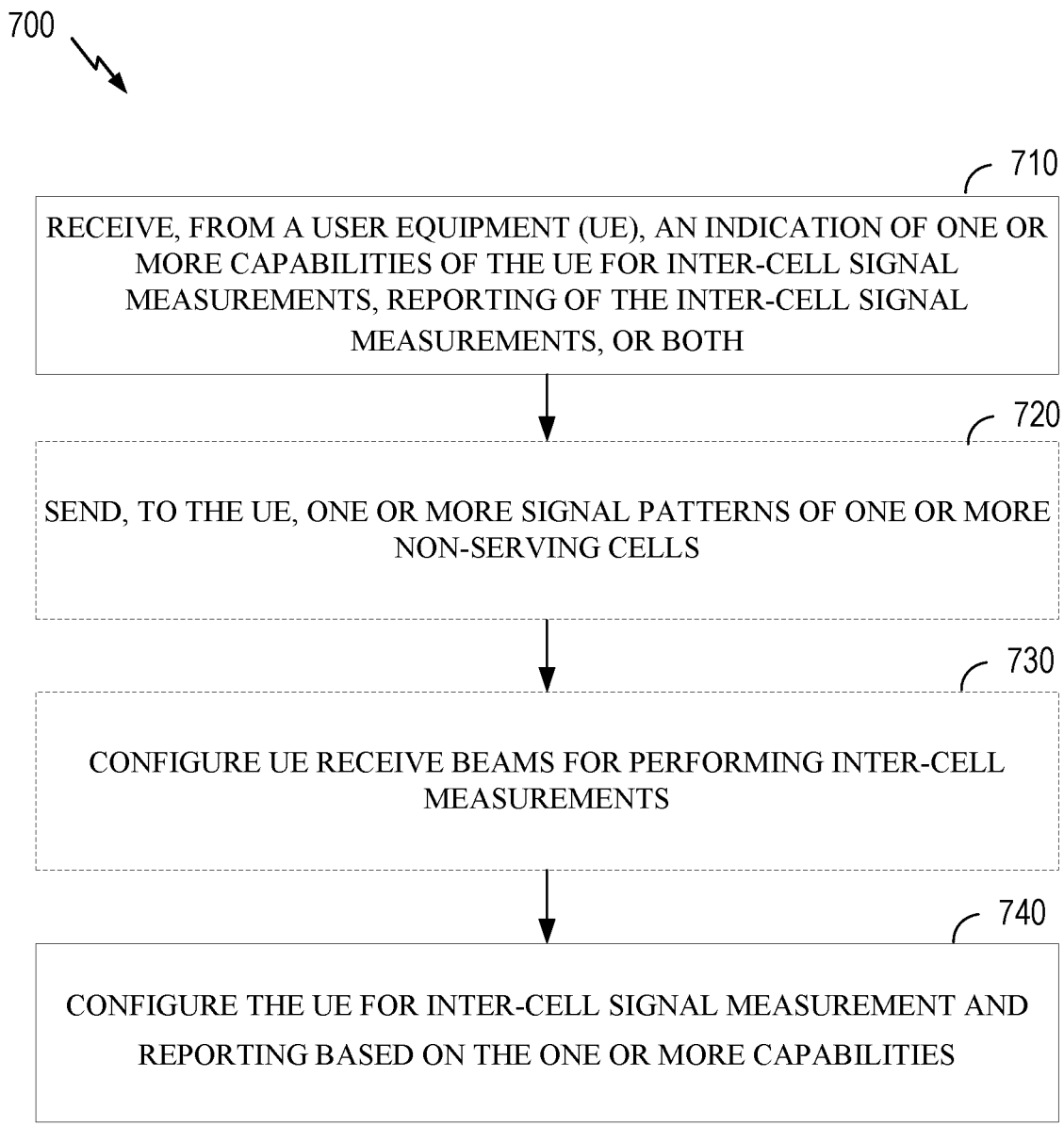
FIG. 7 is a flow diagram illustrating example operations for wireless communication by a BS, in accordance with certain aspects of the present disclosure.

FIG. 7 is a flow diagram illustrating example operations 700 for wireless communication, in accordance with certain aspects of the present disclosure. Operations 700 may be performed, for example, by a BS (such as a BS 102 in the wireless communication network 100). The operations 700 may be complementary to the operations 700 performed by the UE. Operations 700 may be implemented as software components that are executed and run on one or more processors (e.g., controller/processor 240 of FIG. 2). Further, the transmission and reception of signals by the BS in operations 700 may be enabled, for example, by one or more antennas (e.g., antennas 234a-234t of FIG. 2). In certain aspects, the transmission and/or reception of signals by the BS may be implemented via a bus interface of one or more processors (e.g., controller/processor 240) obtaining and/or outputting signals.

The operations 700 may begin, at block 710, by receiving, from a user equipment (UE), an indication of one or more capabilities of the UE for inter-cell signal measurements, reporting of the inter-cell signal measurements, or both.

At block 720, the BS may signal the UE one or more signal patterns of one or more non-serving cells in response to an indication of a capability of the UE to measure one or more non-serving cells having different signal patterns than a serving cell signal pattern.

At block 730, the BS may configure the UE with UE Rx beams to use for performing inter-cell measurements. For example, the BS can configure the UE to use Rx beam of the same or similar Rx gain.

At block 740, the BS configures the UE for inter-cell signal measurement and reporting based on the one or more capabilities.

Figure 8:
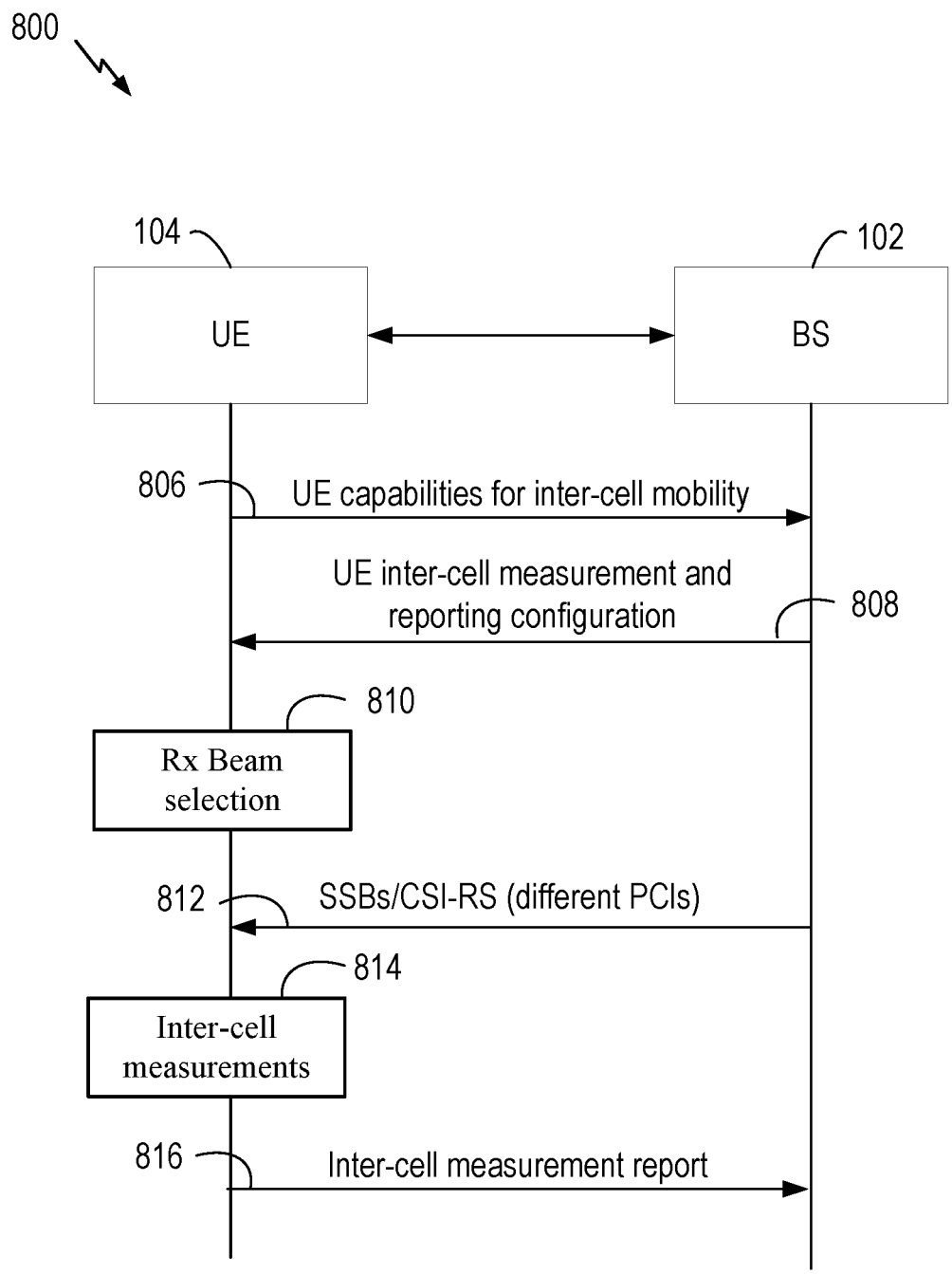
FIG. 8 is a call flow diagram illustrating example signaling for inter-cell measurement and reporting for beam management, in accordance with aspects of the present disclosure.

FIG. 8 is a call flow diagram illustrating example signaling 800 for inter-cell measurement and reporting for beam management, in accordance with aspects of the present disclosure. As shown, at 806, UE 104 sends BS 102 its UE capability information with capabilities for inter-cell mobility (e.g., any of the inter-cell capabilities discussed herein). At 808, BS 102 configures UE 104 for inter-cell measurement and reporting (e.g., any of the configurations discussed herein). At 810, UE 104 selects Rx beams to use for the inter-cell measurements. At 812, BS 102 sends UE 104 SSBs and/or CSI-RSs from different cells associated with different PCIs. At 814, UE 104 performs inter-cell measurements of the SSBs and/or CSI-RSs and, at 816, sends an inter-cell measurement report to BS 102, in accordance with aspects of the present disclosure.

Figure 9:
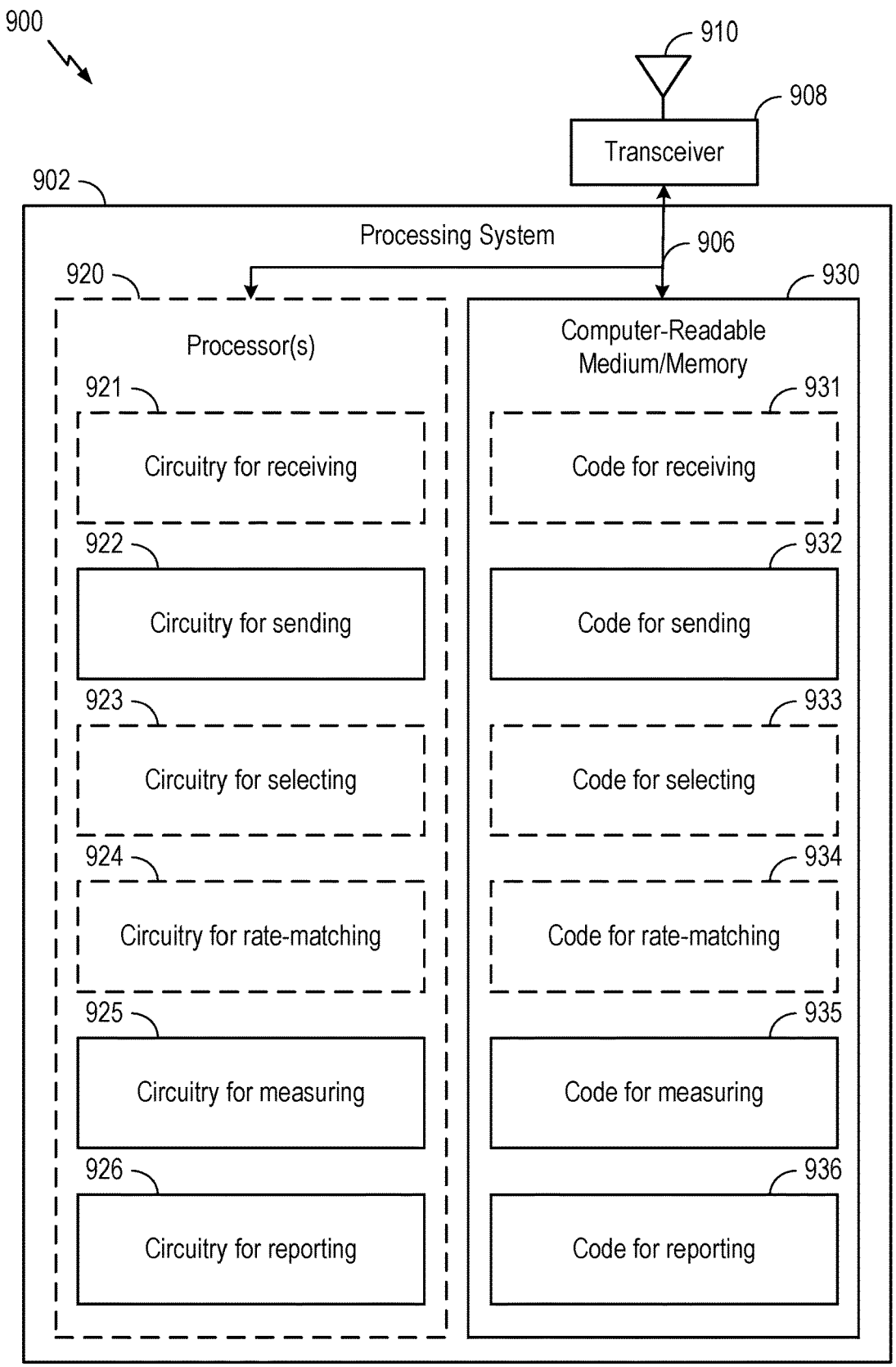
FIG. 9 illustrates an example communications device, in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 5. Communications device 900 includes a processing system 902 coupled to a transceiver 908 (e.g., a transmitter and/or a receiver). Transceiver 908 is configured to transmit and receive signals for communications device 900 via an antenna 910, such as the various signals as described herein. Processing system 902 may be configured to perform processing functions for the communications device 900, including processing signals received and/or to be transmitted by communications device 900.

The processing system 902 includes processor(s) 920 coupled to a computer-readable medium/memory 930 via a bus 906. In certain aspects, computer-readable medium/memory 930 is configured to store instructions (e.g., computer-executable code) that when executed by processor(s) 920, cause processor(s) 920 to perform the operations illustrated in FIG. 5, or other operations for performing the various techniques discussed herein for inter-cell mobility. In certain aspects, computer-readable medium/memory 930 stores code 931 for receiving; code 932 for sending; code 933 for selecting; code 934 for rate-matching; code 935 for measuring; and/or code 936 for reporting. In certain aspects, processor(s) 920 has circuitry configured to implement the code stored in computer-readable medium/memory 930. Processor(s) 920 includes circuitry 921 for receiving; circuitry 922 for sending; circuitry 923 for selecting; circuitry 924 for rate-matching; circuitry 925 for measuring; and/or circuitry 926 for reporting.

Figure 10:
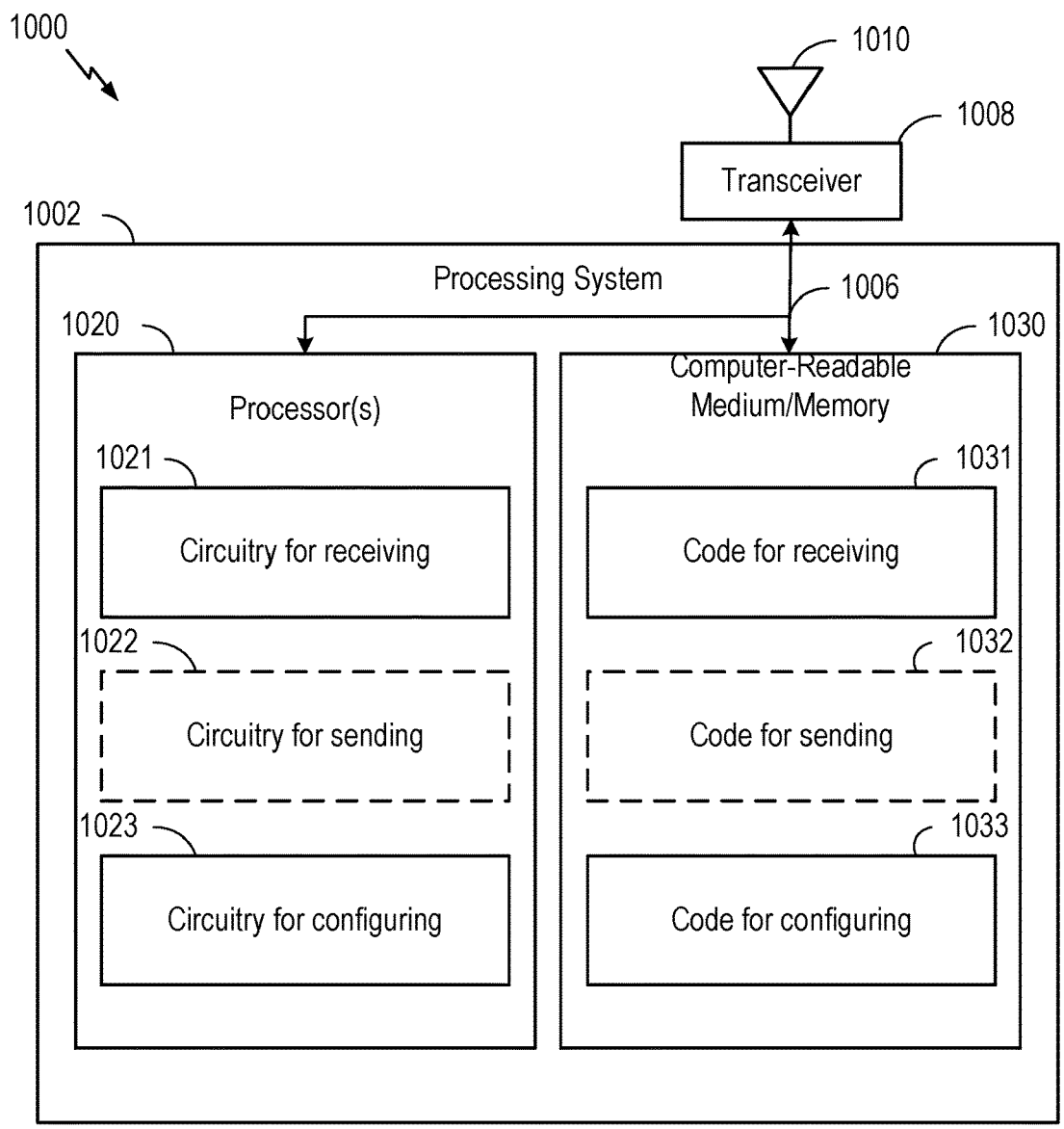
FIG. 10 illustrates another example communications device, in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 7. Communications device 1000 includes a processing system 1002 coupled to a transceiver 1008 (e.g., a transmitter and/or a receiver). Transceiver 1008 is configured to transmit and receive signals for communications device 1000 via an antenna 1010, such as the various signals as described herein. Processing system 1002 may be configured to perform processing functions for the communications device 1000, including processing signals received and/or to be transmitted by communications device 1000.

The processing system 1002 includes processor(s) 1020 coupled to a computer-readable medium/memory 1030 via a bus 1006. In certain aspects, computer-readable medium/memory 1030 is configured to store instructions (e.g., computer-executable code) that when executed by processor(s) 1020, cause processor(s) 1020 to perform the operations illustrated in FIG. 7, or other operations for performing the various techniques discussed herein for inter-cell mobility. In certain aspects, computer-readable medium/memory 1030 stores code 1031 for receiving; code 1032 for sending; and/or code 1033 for configuring. In certain aspects, processor(s) 1020 has circuitry configured to implement the code stored in computer-readable medium/memory 1030. Processor(s) 1020 includes circuitry 1021 for receiving; circuitry 1022 for sending; and/or circuitry 1023 for configuring.

Example Aspects

In addition to the various aspects described above, the aspects can be combined. Some specific combinations of aspects are detailed below:

Aspect 1. A method for wireless communication by a user equipment (UE), comprising: sending, to a base station (BS), an indication of one or more capabilities of the UE for inter-cell signal measurements, reporting of the inter-cell signal measurements, or both; and performing inter-cell signal measurement and reporting based on the one or more capabilities.

Aspect 2. The method of aspect 1, wherein the inter-cell signal measurements comprise measurements of synchronization signal block (SSB) transmissions, channel state information reference signals (CSI-RSs), or a combination thereof, from a serving cell and one or more non-serving cells.

Aspect 3. The method of aspect 2, wherein the indication of the one or more capabilities comprises an indication of a first capability of the UE to support measurement of signals from the non-serving cell having a pattern different than a pattern of signals from the serving cell.

Aspect 4. The method of aspect 3, wherein the pattern defines a periodicity and location of the signals.

Aspect 5. The method of any of aspects 3-4, further comprising: receiving, from the BS, in response to the indication of the first capability, one or more signal patterns of one or more non-serving cells; and storing the one or more signal patterns at the UE.

Aspect 6. The method of any of aspects 3-5, further comprising: rate-matching a physical downlink shared channel (PDSCH) transmission around one or more signals of the one or more non-serving cells based on the one or more signal patterns.

Aspect 7. The method of aspect 6, wherein the rate-matching comprises: determining one or more symbols in which one or more signals of the one or more non-serving cells overlap the PDSCH; and rate-matching the PDSCH around all resource elements (REs) in the one or more symbols.

Aspect 8. The method of any of aspects 6-7, wherein the rate-matching comprises: determining one or more symbols in which one or more signals of the one or more non-serving cells overlap the PDSCH; and rate-matching the PDSCH around resource elements (REs) overlapped with the one or more signals in the one or more symbols.

Aspect 9. The method of any of aspects 1-8, wherein the indication of the one or more capabilities comprises an indication of a second capability of the UE for inter-cell measurement of signals overlapping in time.

Aspect 10. The method of aspect 9, further comprising: receiving time division multiplexed (TDMed) inter-cell signals, in response to the second capability indicating the UE does not support inter-cell measurement of signals overlapping in time.

Aspect 11. The method of any of aspects 9-10, wherein the indication of a second capability comprises an indication of a maximum number of inter-cell signals overlapping in time the UE is capable of measuring.

Aspect 12. The method of aspect 11, further comprising: receiving a number of inter-cell signals overlapping in time, less than the maximum number of inter-cell signals, in response to indication of the second capability.

Aspect 13. The method any of aspects 2-12, further comprising receiving a plurality of signals from the serving cell and the one or more non-serving cells, wherein: signals, of the plurality of signals, from different cells are received in non-overlapping time periods with time division multiplexing (TDM); and consecutive signals, of the plurality of signals, from a same cell are received with a time gap between the consecutive signals.

Aspect 14. The method of aspect 13, wherein a length of the time gap between consecutive signals is based on whether the consecutive signals have a same subcarrier spacing (SCS) or a different SCS, and wherein the time gap is longer when the consecutive signals have different SCSs.

Aspect 15. The method of any of aspects 2-14, wherein: the indication of the one or more capabilities comprises an indication of a third capability of the UE for a minimum processing delay for the reporting of the inter-cell measurements; and the minimum processing delay is based on a number of non-serving cells the UE is configured to measure.

Aspect 16. The method of any of aspects 2-15, wherein: the indication of the one or more capabilities comprises an indication of a third capability of the UE for a minimum processing delay for the reporting of the inter-cell measurements; and the minimum processing delay is based on a number of inter-cell signals overlapping in time the UE is configured to measure.

Aspect 17. The method of aspect 16, wherein the third capability of the UE for the minimum processing delay for the reporting of the inter-cell measurements comprises: a first minimum processing delay for reporting measurements of time division multiplexed (TDMed) inter-cell signals; and a second minimum processing delay for reporting measurements of inter-cell signals that are overlapping in time.

Aspect 18. The method of any of aspects 2-17, wherein performing the inter-cell measurement and reporting comprises: measuring one or more signals from a serving cell using a narrow receive beam; measuring one or more signals from one or more non-serving cells using a wide beam; and reporting raw measurements values or adjusting the measurement values to compensate for a beamforming gain for the measurement using the narrow receive beam with respect to the measurement using the wide beam and reporting the adjusted measurement values.

Aspect 19. The method of any of aspects 2-18, wherein: the UE is configured to perform the inter-cell signal measurements using one or more receive beams associated with a same Rx gain.

Aspect 20. The method of aspect 19, wherein the UE is hardcoded to perform the inter-cell signal measurements using one or more receive beams associated with the same Rx gain according to a wireless standard.

Aspect 21. The method of any of aspects 19-20, wherein the UE is implicitly configured by the BS to perform the inter-cell signal measurements using one or more receive beams associated with the same Rx gain.

Aspect 22. The method of aspect 21, wherein the UE is implicitly configured by a parameter from the BS configuring the UE to measure signals from both the serving cell and the one or more non-serving cells.

Aspect 23. The method of any of aspects 19-22, the one or more receive beams associated with the same Rx gain comprise: one or more wide beams associated with a same UE antenna panel to measure time division multiplexed (TDMed) inter-cell signals; wide beams associated with different UE antenna panels to measure time-overlapping inter-cell signals; or a combination thereof.

Aspect 24. The method of any of aspects 19-23, further comprising: performing measurements of the serving cell and the one or more non-serving cells using the receive beams associated with the same Rx gain; performing additional measurements of the serving cell using a receiver beam with a different Rx gain; and reporting up to two measurements for the serving cell and up to one measurement per non-serving cell, wherein one the measurements for the serving uses the same Rx gain as the measurement for the non-serving cell.

Aspect 25. The method of any of aspects 19-24, further comprising: sending the BS an indication of which signals were measured using a receive beam associated with a same Rx gain.

Aspect 26. A method for wireless communications by a base station (BS), comprising: receiving, from a user equipment (UE), an indication of one or more capabilities of the UE for inter-cell signal measurements, reporting of the inter-cell signal measurements, or both; and configuring the UE for inter-cell signal measurement and reporting based on the one or more capabilities.

Aspect 27. The method of aspect 26, wherein the inter-cell signal measurements comprise measurements of synchronization signal block (SSB) transmissions, channel state information reference signals (CSI-RSs), or a combination thereof, from a serving cell and one or more non-serving cells.

Aspect 28. The method of aspect 27, wherein the indication of the one or more capabilities comprises an indication of a first capability of the UE to support measurement of signals from the non-serving cell having a pattern different than a pattern of signals from the serving cell.

Aspect 29. The method of aspect 28, wherein the pattern defines a periodicity and location of the signals.

Aspect 30. The method of any of aspects 28-28, further comprising: sending, to the UE, in response to the indication of the first capability, one or more signal patterns of one or more non-serving cells.

Aspect 31. The method of any of aspects 26-30, wherein the indication of the one or more capabilities comprises an indication of a second capability of the UE for inter-cell measurement of signals overlapping in time.

Aspect 32. The method of aspect 31, further comprising: time division multiplexing (TDM) inter-cell signals, in response to the second capability indicating the UE does not support inter-cell measurement of signals overlapping in time.

Aspect 33. The method of any of aspects 31-32, wherein the indication of a second capability comprises an indication of a maximum number of inter-cell signals overlapping in time the UE is capable of measuring.

Aspect 34. The method of aspect 33, further comprising: configuring a number of inter-cell signals overlapping in time, less than the maximum number of inter-cell signals, in response to indication of the second capability.

Aspect 35. The method of any of aspects 27-34, further comprising configuring a plurality of signals from the serving cell and the one or more non-serving cells, wherein: signals, of the plurality of signals, from different cells are configured in non-overlapping time periods with time division multiplexing (TDM); and consecutive signals, of the plurality of signals, from a same cell are configured with a time gap between the consecutive signals.

Aspect 36. The method of aspect 35, wherein a length of the time gap between consecutive signals is based on whether the consecutive signals have a same subcarrier spacing (SCS) or a different SCS, and wherein the time gap is longer when the consecutive signals have different SCSs.

Aspect 37. The method of any of aspects 27-36, wherein: the indication of the one or more capabilities comprises an indication of a third capability of the UE for a minimum processing delay for the reporting of the inter-cell measurements; and the minimum processing delay is based on a number of non-serving cells the UE is configured to measure.

Aspect 38. The method of any of aspects 27-37, wherein: the indication of the one or more capabilities comprises an indication of a third capability of the UE for a minimum processing delay for the reporting of the inter-cell measurements; and the minimum processing delay is based on a number of inter-cell signals overlapping in time the UE is configured to measure.

Aspect 39. The method of aspect 38, wherein the third capability of the UE for the minimum processing delay for the reporting of the inter-cell measurements comprises: a first minimum processing delay for reporting measurements of time division multiplexed (TDMed) inter-cell signals; and a second minimum processing delay for reporting measurements of inter-cell signals that are overlapping in time.

Aspect 40. The method of any of aspects 27-39, further comprising: receiving raw measurements values from the UE or receiving adjusted measurement values compensated for a difference in UE receive beam beamforming gains.

Aspect 41. The method of any of aspects 27-40, further comprising: configuring the UE to perform the inter-cell signal measurements using one or more receive beams associated with a same Rx gain.

Aspect 42. The method of aspect 41, wherein the UE is implicitly configured by the BS to perform the inter-cell signal measurements using one or more receive beams associated with the same Rx gain.

Aspect 43. The method of aspect 42, wherein the UE is implicitly configured by a parameter from the BS configuring the UE to measure signals from both the serving cell and the one or more non-serving cells.

Aspect 44. The method of any of aspects 27-43, further comprising: receiving an indication, from the UE, indicating which signals were measured using a receive beam associated with a same Rx gain.

Aspect 45. An apparatus comprising means for performing the method of any of aspects 1 through (X-1).

Aspect 46. An apparatus comprising at least one processor and a memory coupled to the at least one processor, the memory comprising code executable by the at least one processor to cause the apparatus to perform the method of any of aspects 1 through (X-1).

Aspect 47. A computer readable medium storing computer executable code thereon for wireless communications that, when executed by at least one processor, cause an apparatus to perform the method of any of aspects 1 through (X-1).

Additional Wireless Communication Network Aspects

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements. In addition, these service may co-exist in the same subframe.

Returning to FIG. 1, various aspects of the present disclosure may be performed within the example wireless communication network 100.

In 3GPP, the term "cell" can refer to a coverage area of a Node B (NB) and/or a NB subsystem serving this coverage area, depending on the context in which the term is used. A macro cell may generally cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS or a home BS.

BS 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with core network 190 through second backhaul links 184. BSs 102 may communicate directly or indirectly (e.g., through the EPC 160 or core network 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some BSs, such as BS 180 may operate in a traditional sub-6 GHz spectrum, in millimeter wave (mmWave) frequencies, and/or near mmWave frequencies in communication with the UE 104. When BS 180 operates in mmWave or near mmWave frequencies, the BS 180 may be referred to as an mmWave BS.

The communication links 120 between BSs 102 and, for example, UEs 104, may be through one or more carriers. For example, BSs102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers (CCs) may include a primary component carrier (PCC) and one or more secondary component carriers (SCCs). A PCC may be referred to as a primary cell (PCell) and a SCC may be referred to as a secondary cell (SCell).

Wireless communications network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

Core network 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and core network 190. Generally, AMF 192 provides QoS flow and session management.

All user Internet protocol (IP) packets are transferred through UPF 195, which is connected to the IP Services 197, and which provides UE IP address allocation as well as other functions for core network 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the PUSCH) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be TDD, in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI).

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and 2 $\mu$ slots/subframe. The subcarrier spacing (SCS) and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of inter-cell measurement and reporting in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g., 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer- readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 5-8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. An apparatus for wireless communication, comprising:
a memory; and
at least one processor coupled to the memory, wherein the at least one processor is configured to:
receive a configuration for inter-cell measurement, wherein the configuration is associated with a plurality of reference signals, wherein each reference signal of the plurality of reference signals is associated with a respective physical cell identifier (PCI) of a plurality PCIs, wherein the plurality of PCIs are different, and wherein the plurality of reference signals are simultaneous; and
report a plurality of measurement values based on reception of the plurality of reference signals that are simultaneous, wherein one or more non-largest measurement values of the plurality of measurement values are represented by a respective difference from a largest measurement value of the plurality of measurement values.

2. The apparatus of claim 1, wherein the plurality of measurement values includes a plurality of reference signal received power (RSRP) values.

3. The apparatus of claim 1, wherein the configuration for the inter-cell measurement includes an association of the plurality of reference signals to a group, and wherein the inter-cell measurement for the group includes simultaneously measured reference signals.

4. The apparatus of claim 3, wherein the at least one processor is further configured to:
measure the plurality of reference signals simultaneously based on the configuration for the inter-cell measurement.

5. An apparatus for wireless communication, comprising:
a memory; and
at least one processor coupled to the memory, wherein the at least one processor is configured to:
receive a configuration for inter-cell measurement, wherein the configuration is associated with a plurality of reference signals, wherein each reference signal of the plurality of reference signals is associated with a respective physical cell identifier (PCI) of a plurality PCIs, wherein the plurality of PCIs are different, and wherein the plurality of reference signals are simultaneous; and
report a plurality of measurement values based on reception of the plurality of reference signals that are simultaneous, wherein the plurality of measurement values includes a largest measurement value and one or more other measurement values, and wherein each respective measurement value of the one or more other measurement values is represented by a respective difference from the largest measurement value.

6. The apparatus of claim 5, wherein the plurality of measurement values includes a plurality of reference signal received power (RSRP) values.

7. The apparatus of claim 5, wherein the configuration for the inter-cell measurement includes an association of the plurality of reference signals to a group, and wherein the inter-cell measurement for the group includes simultaneously measured reference signals.

8. The apparatus of claim 7, wherein the at least one processor is configured to:
measure the plurality of reference signals simultaneously based on the configuration for the inter-cell measurement.

9. An apparatus for wireless communication, comprising:
a memory; and
at least one processor coupled to the memory, wherein the at least one processor is configured to:
receive a configuration for inter-cell measurement, wherein the configuration is associated with a plurality of reference signals, wherein each reference signal of the plurality of reference signals is associated with a respective physical cell identifier (PCI) of a plurality PCIs, wherein the plurality of PCIs are different, and wherein the plurality of reference signals overlap in time; and
report a plurality of measurement values based on reception of the plurality of reference signals that overlap in time, wherein one or more non-largest measurement values of the plurality of measurement values are represented by a respective difference from a largest measurement value of the plurality of measurement values.

10. The apparatus of claim 9, wherein the plurality of measurement values includes a plurality of reference signal received power (RSRP) values.

11. The apparatus of claim 9, wherein the configuration for the inter-cell measurement includes an association of the plurality of reference signals to a group, and wherein the inter-cell measurement for the group includes simultaneously measured reference signals.

12. The apparatus of claim 11, wherein the at least one processor is further configured to:
measure the plurality of reference signals simultaneously based on the configuration for the inter-cell measurement.

13. An apparatus for wireless communication, comprising:
a memory; and
at least one processor coupled to the memory, wherein the at least one processor is configured to:
receive a configuration for inter-cell measurement, wherein the configuration is associated with a plurality of reference signals, wherein each reference signal of the plurality of reference signals is associated with a respective physical cell identifier (PCI) of a plurality PCIs, wherein the plurality of PCIs are different, and wherein the plurality of reference signals overlap in time; and report a plurality of measurement values based on reception of the plurality of reference signals that overlap in time, wherein the plurality of measurement values includes a largest measurement value and one or more other measurement values, and wherein each respective measurement value of the one or more other measurement values is represented by a respective difference from the largest measurement value.

14. The apparatus of claim 13, wherein the plurality of measurement values includes a plurality of reference signal received power (RSRP) values.

15. The apparatus of claim 13, wherein the configuration for the inter-cell measurement includes an association of the plurality of reference signals to a group, and wherein the inter-cell measurement for the group includes simultaneously measured reference signals.

16. The apparatus of claim 15, wherein the at least one processor is further configured to:
measure the plurality of reference signals simultaneously based on the configuration for the inter-cell measurement.

* * * * *